(12) United States Patent
Krol et al.

(10) Patent No.: US 12,075,193 B2
(45) Date of Patent: *Aug. 27, 2024

(54) EMOTES FOR NON-VERBAL COMMUNICATION IN A VIDEOCONFERENCE SYSTEM

(71) Applicant: Katmai Tech Inc., New York, NY (US)

(72) Inventors: Gerard Cornelis Krol, Leiden (NL); Erik Stuart Braund, Saugerties, NY (US)

(73) Assignee: Katmai Tech Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,394

(22) Filed: May 22, 2023

(65) Prior Publication Data

US 2023/0291869 A1    Sep. 14, 2023

Related U.S. Application Data

(63) Continuation of application No. 17/472,176, filed on Sep. 10, 2021, now Pat. No. 11,695,901, which is a continuation of application No. 17/211,579, filed on Mar. 24, 2021, now Pat. No. 11,140,361.

(51) Int. Cl.
*H04N 7/15* (2006.01)
*G06F 3/01* (2006.01)
*G06F 3/16* (2006.01)

(52) U.S. Cl.
CPC .............. *H04N 7/157* (2013.01); *G06F 3/011* (2013.01); *G06F 3/017* (2013.01); *G06F 3/167* (2013.01)

(58) Field of Classification Search
None
See application file for complete search history.

(56) References Cited

U.S. PATENT DOCUMENTS

| | | | |
|---|---|---|---|
| 11,140,361 B1 | 10/2021 | Krol et al. | |
| 11,695,901 B2 * | 7/2023 | Krol | A63F 13/86 |
| | | | 348/14.03 |
| 2010/0153497 A1 | 6/2010 | Sylvain et al. | |
| 2011/0225039 A1 | 9/2011 | Goldman et al. | |
| 2012/0162350 A1* | 6/2012 | Lee | H04M 1/7243 |
| | | | 348/14.03 |
| 2013/0321564 A1 | 12/2013 | Smith et al. | |
| 2014/0058807 A1 | 2/2014 | Altberg et al. | |
| 2019/0371060 A1 | 12/2019 | Energin et al. | |

(Continued)

*Primary Examiner* — Hemant S Patel
(74) *Attorney, Agent, or Firm* — Sterne, Kessler, Goldstein & Fox P.L.L.C.

(57) ABSTRACT

A method is disclosed for videoconferencing in a three-dimensional virtual environment. In the method, a video stream captured from a camera on a first device of a first user and a specification of an emote are received. The specification is input by the first user through the first device. Then, the video stream is mapped onto a three-dimensional model of an avatar. From a perspective of a virtual camera of a second user, the three-dimensional virtual environment is rendered for display to the second user through a second device. This rendering includes the mapped three-dimensional model of the avatar, and the emote attached to the three-dimensional model of the avatar, where the emote emits sound played by the second device.

20 Claims, 13 Drawing Sheets

(56) References Cited

U.S. PATENT DOCUMENTS

2020/0099891 A1 3/2020 Valli et al.
2020/0322395 A1 10/2020 Copley et al.
2022/0070235 A1* 3/2022 Yerli ...................... H04N 7/155
2022/0311971 A1 9/2022 Krol et al.

* cited by examiner

EMOTES FOR NON-VERBAL COMMUNICATION IN A VIDEOCONFERENCE SYSTEM

CROSS-REFERENCE TO RELATED APPLICATIONS

This is a Continuation Application of Utility patent application Ser. No. 17/472,176 filed on Sep. 10, 2021, which is a Continuation Application of Utility patent application Ser. No. 17/211,579, filed on Mar. 24, 2021, the contents of both incorporated herein by reference in their entirety.

BACKGROUND

Field

This field is generally related to videoconferencing.

Related Art

Videoconferencing involves the reception and transmission of audio-video signals by users at different locations for communication between people in real time. Videoconferencing is widely available on many computing devices from a variety of different services, including the ZOOM videoconferencing service available from Zoom Communications Inc. of San Jose, CA. Some videoconferencing software, such as the FaceTime application available from Apple Inc. of Cupertino, CA, comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other users' devices.

Many of these videoconferencing applications have a screen share functionality. When a user decides to share their screen (or a portion of their screen, or a particular window), a stream is transmitted to the other users' devices with the contents of their screen. In some cases, other users can even control what is on the user's screen. In this way, users can collaborate on a project or make a presentation to the other meeting participants.

Recently, videoconferencing technology has gained importance. Many workplaces, trade shows, meetings, conferences, schools, and places of worship have closed or encouraged people not to attend for fear of spreading disease, in particular COVID-19. Virtual conferences using videoconferencing technology are increasingly replacing physical conferences. In addition, this technology provides advantages over physically meeting, such as avoiding travel and commuting.

However, use of this videoconferencing technology often causes loss of a sense of place because there is an experiential aspect to meeting in person physically (i.e., being in the same place) that is lost when conferences are conducted virtually. In addition, there is a social aspect to being able to posture oneself and look at one's peers. This feeling of experience is important in creating relationships and social connections. Yet, this feeling is lacking when it comes to conventional videoconferences.

In addition to videoconferencing, massively multiplayer online games (MMOG or MMO) provide a way for people to meet online. Massively multiplayer online games (MMOG or MMO) generally can handle many more than 25 participants. These games often have hundreds or thousands of players on a single server. MMOs often allow players to navigate avatars around a virtual world. Sometimes these MMOs allow users to speak with one another or send messages to one another. Examples include the ROBLOX game available from Roblox Corporation of San Mateo, CA, and the MINECRAFT game available from Mojang Studios of Stockholm, Sweden.

Using avatars to interact with others also suffers limitations in terms of social interaction. Avatars usually cannot communicate facial expressions, which people often make inadvertently. These facial expressions are observable on videoconference. While facial expressions are useful for nonverbal communication, it can still be hard to discern them from a distance or from behind. Also, acting out certain things like a high five or an applause over videoconference might be too awkward or unprofessional.

Improved approaches are needed for videoconferencing.

BRIEF SUMMARY

In an embodiment, a method is provided for videoconferencing in a three-dimensional virtual environment. In the method, a video stream captured from a camera on a first device of a first user and a specification of an emote are received. The specification is input by the first user through the first device. Then, the video stream is mapped onto a three-dimensional model of an avatar. From a perspective of a virtual camera of a second user, the three-dimensional virtual environment is rendered for display to the second user through a second device. This rendering includes the mapped three-dimensional model of the avatar, and the emote attached to the three-dimensional model of the avatar, where the emote emits sound played by the second device.

System, device, and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

While facial expressions are observable on videoconference and are useful for nonverbal communication, they are limited in certain respects. For example, it may be difficult to see when the portion of a user's screen devoted to the video is small. Also, certain body language such as an applause or other hand gesture may be lost in a video that only captures a participant's head. Various embodiments described herein addresses these and other issues by providing an emote that may be attached to the participant's avatar in a three-dimensional world As used herein, the term "emotes" refers generally to graphical or video images that may be used to enhance non-verbal communication in a videoconferencing system. Emotes may also be referred to as "emojis", "emoticons", or other similar terms that allow expression of one or more emotions in place of, or in addition to, verbal communication in a videoconferencing platform. In an embodiment, emotes may be shown adjacent to (e.g., on or close to) a participant's avatar. Emotes may include images or videos mapped on to a three-dimensional object or the participant's three-dimensional avatar. One example is a lightbulb that is floating next to a participant's avatar that indicates that the participant has an idea or would like to speak. Further examples and embodiments are described below.

Video Conference with Avatars in a Virtual Environment

Figure 1:
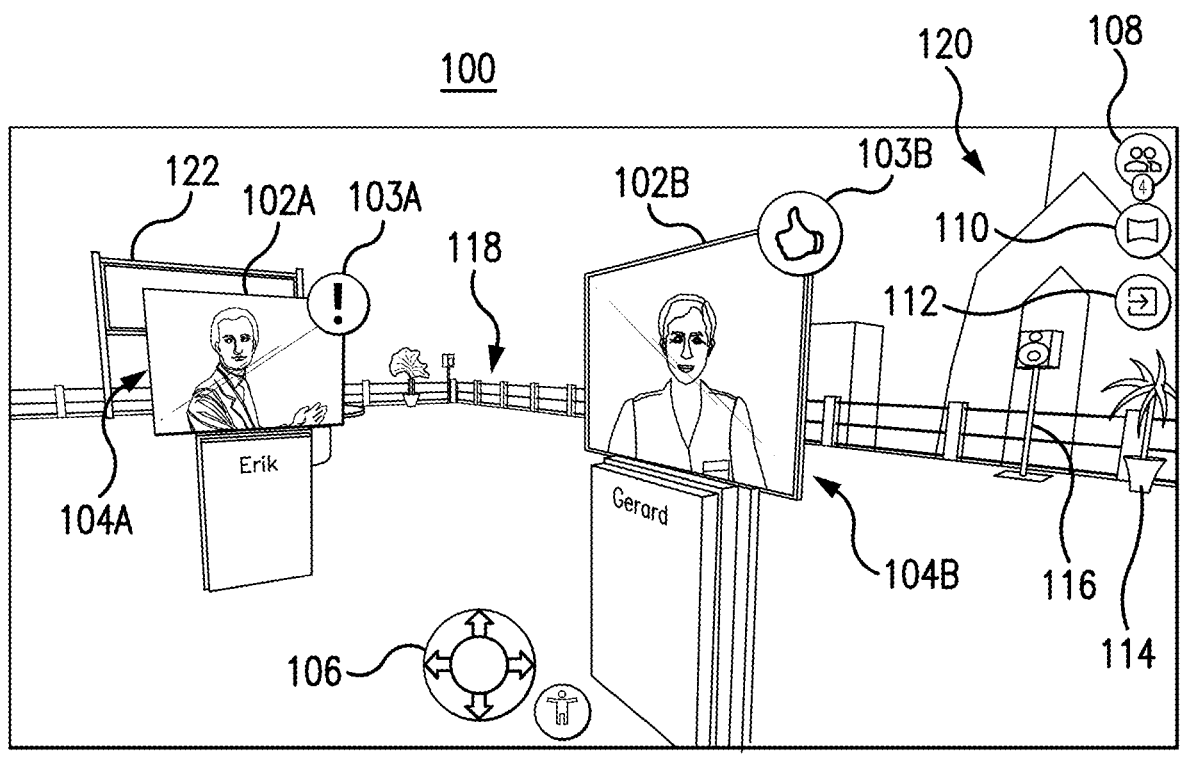
FIG. 1 is a diagram illustrating an example interface that provides videoconferencing in a virtual environment with video streams being mapped onto avatars with emotes.

FIG. 1 is a diagram illustrating an example of an interface 100 that provides videoconferences in a virtual environment with video streams being mapped onto avatars.

Interface 100 may be displayed to a participant to a videoconference. For example, interface 100 may be rendered for display to the participant and may be constantly updated as the videoconference progresses. A user is any person using the software system described herein. A participant refers to a user in a videoconference. A participant may control the orientation of their virtual camera using, for example, keyboard inputs. In this way, the participant can navigate around a virtual environment. In an embodiment, different inputs may change the virtual camera's X and Y position and pan and tilt angles in the virtual environment. In further embodiments, a participant may use inputs to alter height (the Z coordinate) or yaw of the virtual camera. In still further embodiments, a participant may enter inputs to cause the virtual camera to "hop" up while returning to its original position, simulating gravity. The inputs available to navigate the virtual camera may include, for example, keyboard and mouse inputs, such as WASD keyboard keys to move the virtual camera forward backward left right on an X-Y plane, a space bar key to "hop" the virtual camera, and mouse movements specifying changes in pan and tilt angles.

Interface 100 includes avatars 102A and 102B, which each represent different participants to the videoconference. Avatars 102A and 102B, respectively, have texture mapped video streams 104A and 102B from devices of the first and second participant. A texture map is an image applied (mapped) to the surface of a shape or polygon. Texture mapping here can also include other ways of applying an image to the surface of a shape or polygon, including projective texture mapping and UV mapping. UV mapping is the 3D ("three dimensional") modeling process of projecting a 2D image to a 3D model's surface for texture mapping. The letters "U" and "V" denote the axes of the 2D texture because "X", "Y", and "Z" are already used to denote the axes of the 3D object in model space. Here, the images are respective frames of the video. The camera devices capturing video streams 104A and 102B are positioned to capture faces of the respective participants. In this way, the avatars have texture mapped thereon moving images of faces as participants in the meeting talk and listen.

Similar to how the virtual camera is controlled by the user viewing interface 100, the location and direction of avatars 102A and 102B are controlled by the respective participants they represent. In one aspect of an embodiment, avatars 102A and 102B are three-dimensional models represented by a mesh. Each of avatars 102A and 102B may have the respective participant's name underneath the avatar.

The avatars 102A and 102B are controlled by the respective user. Each avatars 102A and 102B may be positioned at a point corresponding to where their own virtual cameras are located within the virtual environment. Just as the user viewing interface 100 can move around the virtual camera, the various users can move around their respective avatars 102A and 102B.

The avatars 102A and 102B have emotes 103A and 103B, respectively, attached to them. Emotes 103A and 103B are attached to the respective avatars 102A and 102B in that they are positioned in the virtual environment based on the position of the avatars 102A and 102B. Emotes 103A and 103B may each be a child of the respective avatars 102A and 102B. Alternatively or additionally, emotes 103A and 103B may be positioned relative to the respective avatars 102A and 102B using a physics simulation. In this way, the emote may be located within the three-dimensional virtual environment in accordance with the position input by the user of the corresponding avatar. Additionally, or alternatively, the emote may be oriented within the three-dimensional virtual environment in accordance with the direction input by the user of the corresponding avatar. For example, emotes 103A and 103B may be positioned on or close to the video stream-mapped avatar.

In an example operation, a new position and direction of a user in the three-dimensional virtual environment may be received. When the new position and direction is received, the three-dimensional virtual environment is re-rendered from the perspective of a virtual camera. The re-rendered, mapped three-dimensional model of the avatar located at the position and oriented at the direction. The emote is located and oriented within the three-dimensional virtual environment in accordance with the position and direction input by the user.

In different examples, the emote may be: (1) a 3D model, (2) an image placed on or texture mapped on a surface of a 3D model, (3) a transparent or partially transparent 2D or 3D texture, (4) text, (5) particle effects, (6) lights, or (7) post-processing effects like bloom or shimmer. The emote may be static or contain an animation or video. It is possible that the emote may be interacted with or that the emote may itself interact with the world. For example, an emote that contains water may cause water to fall to the ground of the virtual environment and wet the ground.

The virtual environment rendered in interface 100 includes background image 120 and a three-dimensional model 118 of an arena. The arena may be a venue or building in which the videoconference should take place. The arena may include a floor area bounded by walls. Three-dimensional model 118 may include a mesh and texture. Other approaches to representing the surface of three-dimensional model 118 may be possible as well. For example, polygon modeling, curve modeling, and digital sculpting may be possible. Further, three-dimensional model 118 may be represented by voxels, splines, geometric primitives, polygons, or any other possible representations in three-dimensional space. Three-dimensional model 118 may also include a specification of light sources. The light sources may include, for example, point, directional, spotlight, and/or ambient light sources. The objects may also have certain properties describing how they reflect light. For example, the properties may include diffuse, ambient, and/or spectral lighting interactions.

Emotes 103A and 103B may provide the sense of sound being emitted. Sounds associated with the emotes may be played to the user viewing interface 100. The sounds may be transmitted from devices of the users controlling avatars 104A and B respectively. The sounds may be processed based on the position of the virtual camera of interface 100 relative to the positions of avatars 104A and B. This processing will be discussed below with respect to FIGS. 9-10.

In addition to the arena, the virtual environment can include various other three-dimensional models that illustrate different components of the environment. For example, the three-dimensional environment can include a decorative model 114, a speaker model 116, and a presentation screen model 122. Just as three-dimensional model 118, these models can be represented using any mathematical way to represent a geometric surface in three-dimensional space. These models may be separate from three-dimensional model 118 or combined into a single representation of the virtual environment.

Decorative models, such as model 114, serve to enhance the realism and increase the aesthetic appeal of the arena. Speaker model 116 may virtually emit sound, such as presentation and/or background music. Presentation screen model 122 can serve to provide an outlet to present a presentation. Video of the presenter or a presentation screen share may be texture mapped onto presentation screen model 122.

Button 108 may provide the user a list of participants. For example, after a user selects button 108, the user could chat with other participants by sending text messages, individually or as a group.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60° and 110°, which is commensurate with a wide-angle lens and human vision. However, selecting button 110 may cause the virtual camera to increase the field of view to exceed 170°, commensurate with a fisheye lens. This may enable a user to have broader peripheral awareness of its surroundings in the virtual environment.

Finally, button 112 allows the user to exit the virtual environment. Selecting button 112 may cause a notification to be sent to devices belonging to other participants, signaling to their devices to stop displaying the avatar corresponding to the user previously viewing interface 100.

In this way, interface 100 illustrates a virtual 3D space is used to conduct videoconferencing. Every user controls an avatar that they can control to move around, look around, jump or do other things that change the position or orientation. A virtual camera shows the user the virtual 3D environment and the other avatars. The avatars of the other users are an integral part a virtual display that shows an image of the user captured from the user's camera.

By providing users a sense of space and allowing users to see each other's faces, the various embodiments described herein provide a more social experience than conventional web conferencing or conventional MMO gaming. That more social experience has a variety of applications. For example, it may be used in online shopping. More specifically, interface 100 may be used in applications such as virtual grocery stores, houses of worship, trade shows, business-to-business (B2B) sales, business-to-consumer (B2C) sales, schools, restaurants or lunchrooms, product releases, construction site visits (e.g., for architects, engineers, contractors), office spaces (e.g., people working "at their desks" virtually), control of machinery remotely (e.g., ships, vehicles, planes, submarines, drones, drilling equipment, etc.), plant/factory control rooms, medical procedures, garden designs, virtual tours with guides, music events (e.g., concerts), lectures (e.g., "TED Talks"), meetings of political parties, board meetings, underwater research, research of hard-to-reach places, training for emergencies (e.g., fire), cooking, shopping (e.g., checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally cannot walk or stand up, presenting the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/sword fighting/martial arts, reenactments (e.g., reenacting a crime scene and/or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective that a user wishes to experience the reactions), job interviews, game shows, interactive fiction (e.g., murder mystery), virtual fishing, virtual sailing, psychological research, behavioral analysis, virtual sports (e.g., climbing/bouldering), controlling lights and devices in a home or other location (e.g., home automation), memory palace, archaeology, gift shop, virtual visit so customers will be more comfortable on their real visit, virtual medical procedures to explain the procedures and have people feel more comfortable, and virtual trading floor/financial marketplace/stock market (e.g., integrating real-time data and video feeds into the virtual world, real-time transactions and analytics), virtual location people have to go as part of their work so they will actually meet each other organically (e.g., if a user wants to create an invoice, it is only possible from within the virtual location), virtual court or arbitration room, online dating, augmented reality where the face of the person may be projected on top of their AR headset (or helmet) so their facial expressions may be seen (useful for military, law enforcement, firefighters, special ops, etc.), and making reservations (e.g., for a certain holiday home, car, etc.)

Figure 2:
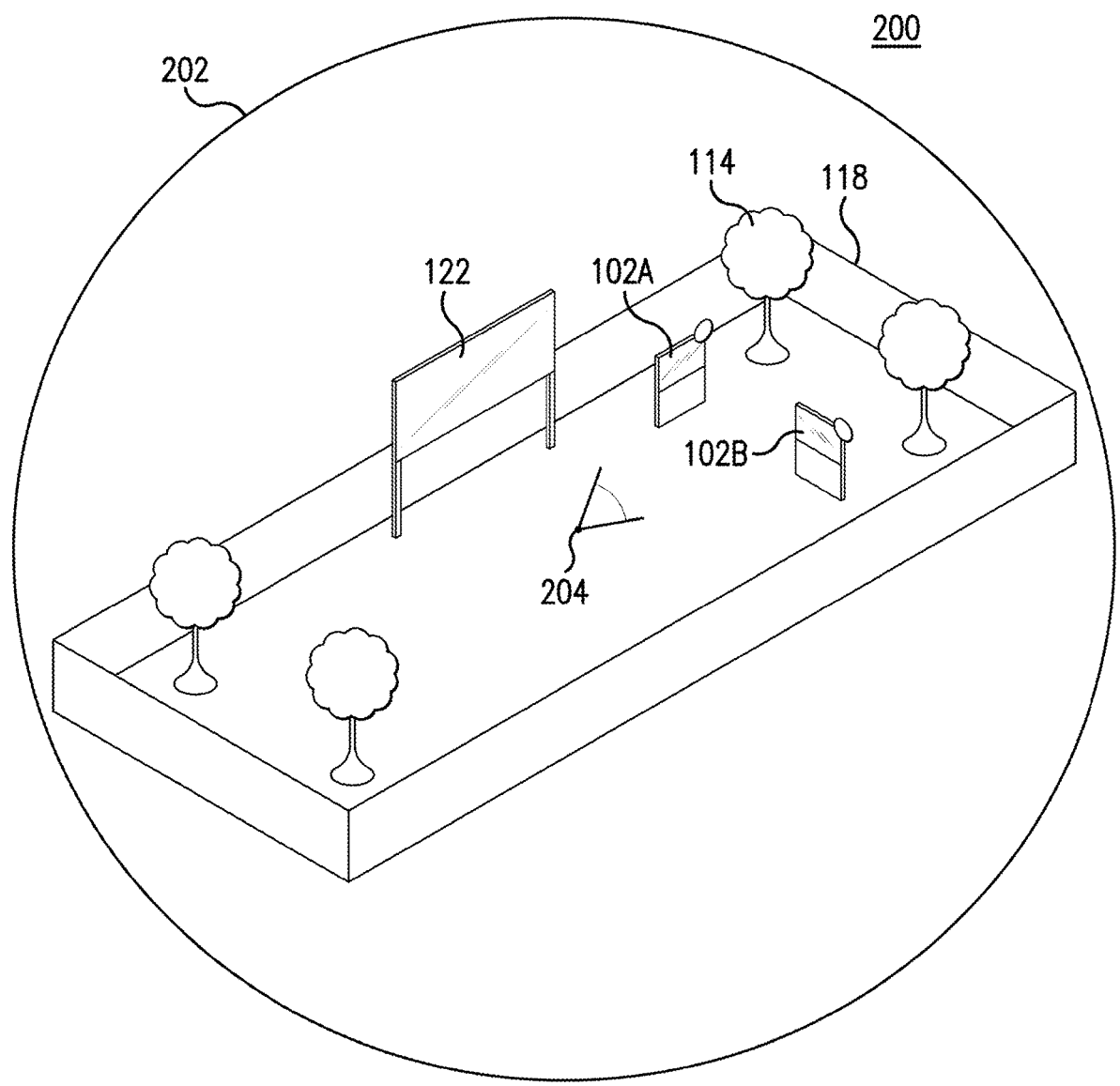
FIG. 2 is a diagram illustrating a three-dimensional model used to render a virtual environment with avatars for videoconferencing.

FIG. 2 is a diagram 200 illustrating a three-dimensional model used to render a virtual environment with avatars for videoconferencing. Just as illustrated in FIG. 1, the virtual environment here includes three-dimensional model 118 of an arena, and other various three-dimensional models, including three-dimensional decorative model 114 and three-dimensional presentation screen model 122. Also as illustrated in FIG. 1, diagram 200 includes avatars 102A and 102B navigating around the virtual environment.

As described above, interface 100 in FIG. 1 is rendered from the perspective of a virtual camera. That virtual camera is illustrated in diagram 200 as a virtual camera 204. As mentioned above, the user viewing interface 100 in FIG. 1 may control virtual camera 204 and navigate the virtual camera in three-dimensional space. Interface 100 is constantly being updated and re-rendered according to the new position of virtual camera 204 and any changes of the models within the field of view of virtual camera 204. As described above, the field of view of virtual camera 204 may be a frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other embodiments, other shapes instead of sphere 202 may be used to texture map the background image. In various alternative embodiments, the shape may be a cylinder, cube, rectangular prism, or any other three-dimensional geometry.

Figure 3:
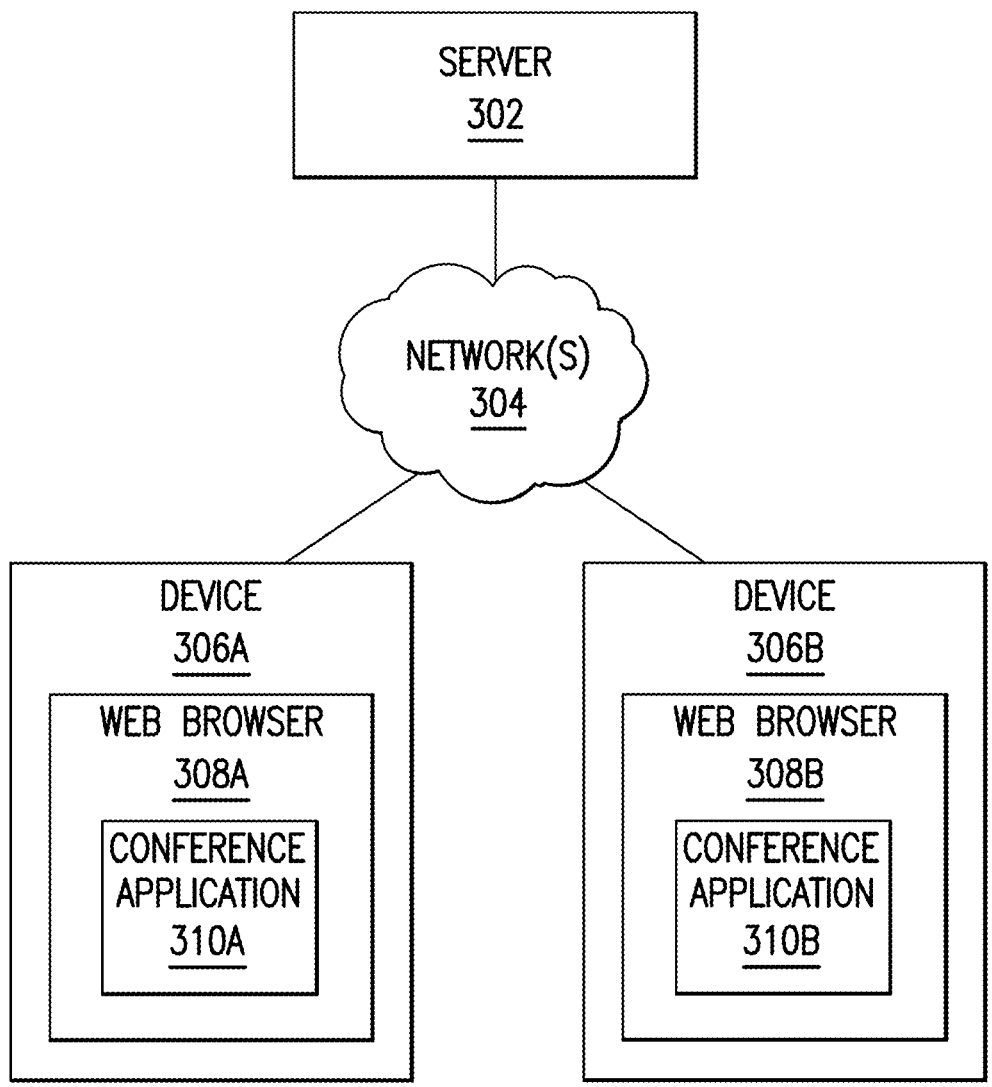
FIG. 3 is a diagram illustrating a system that provides videoconferences in a virtual environment.

FIG. 3 is a diagram illustrating a system 300 that provides videoconferences in a virtual environment. System 300 includes a server 302 coupled to devices 306A and 306B via one or more networks 304.

Server 302 provides the services to connect a videoconference session between devices 306A and 306B. As will be described in greater detail below, server 302 communicates notifications to the devices of conference participants (e.g., devices 306A-B) such as when new participants join the conference and when existing participants leave the conference. Server 302 communicates messages describing a position and direction in a three-dimensional virtual space for respective participant's virtual cameras within the three-dimensional virtual space. Server 302 also communicates video and audio streams between the respective devices of the participants (e.g., devices 306A-B). Finally, server 302 stores and transmits data describing data specifying a three-dimensional virtual space to the respective devices 306A-B.

In addition to the data necessary for the virtual conference, server 302 may provide executable information that instructs devices 306A and 306B on how to render the data to provide the interactive conference.

Server 302 may respond to request packets with a response packet. Server 302 may be implemented as a web server. A web server may include software and hardware that uses HTTP (Hypertext Transfer Protocol) and other protocols to respond to client requests made over the World Wide Web. The main job of a web server is to display website content through storing, processing, and delivering webpages to users.

In an alternative embodiment, communication between devices 306A and 306B happens not through server 302 but on a peer-to-peer basis. In that embodiment, one or more of the data describing the respective participants' location and direction, the notifications regarding new and existing participants, emote specifications (which may be referred to as "specification of emotes" or, simply, "specification"), and the video and audio streams of the respective participants are communicated not through server 302 but directly between devices 306A-B. This is illustrated, for example, in FIG. 4D as described further herein.

Network 304 enables communication between the various devices 306A-B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi-Fi network, a Wi-Max network, any other type of network, or any combination of two or more such networks.

Devices 306A-B are each devices of respective participants to the virtual conference. Devices 306A-B each receive data necessary to conduct the virtual conference and render the data necessary to provide the virtual conference. As will be described in greater detail below, devices 306A-B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A-B may be any type of computing device, including a laptop, a desktop, a smartphone, or a tablet computer, or wearable computer (such as a smartwatch or an augmented reality or a virtual reality headset).

Web browsers 308A-B can retrieve a network resource (such as a webpage) addressed by the link identifier (such as a uniform resource locator, or URL) and present the network resource for display. In particular, web browsers 308A-B is a software application for accessing information on the World Wide Web. Usually, web browsers 308A-B makes this request using the hypertext transfer protocol (HTTP or HTTPS). When a user requests a web page from a particular website, the web browser retrieves the necessary content from a web server, interprets and executes the content, and then displays the page on a display on devices 306A-B shown as client/counterpart conference applications 310A-B. For example, the content may have HTML and client-side scripting, such as JavaScript. Once displayed, a user can input information and make selections on the page, which can cause web browsers 308A-B to make further requests.

Conference applications 310A-B may be a web application downloaded from server 302 and configured to be executed by the respective web browsers 308A-B. In an embodiment, conference applications 310A-B may be a JavaScript application. For example, conference applications 310A-B may be written in a higher-level language, such as a Typescript language, and translated or compiled into JavaScript. Conference applications 310A-B are configured to interact with the WebGL JavaScript application programming interface. It may have control code specified in JavaScript and shader code written in OpenGL ES Shading Language (GLSL ES). Using the WebGL API, conference applications 310A-B may be able to utilize a graphics processing unit (not shown) of devices 306A-B. Moreover, OpenGL rendering of interactive two-dimensional and three-dimensional graphics without the use of plug-ins.

Conference applications 310A-B receives the data from server 302 describing position and direction of other avatars and three-dimensional modeling information describing the virtual environment. In addition, conference applications 310A-B receives video and audio streams of other conference participants from server 302.

Conference applications 310A-B renders three three-dimensional modeling data, including data describing the three-dimensional environment, data representing any emotes, and data representing the respective participant avatars. This rendering may involve rasterization, texture mapping, ray tracing, shading, or other rendering techniques. In an embodiment, the rendering may involve ray tracing based on the characteristics of the virtual camera. Ray tracing involves generating an image by tracing a path of light as pixels in an image plane and simulating the effects of his encounters with virtual objects. In some embodiments, to enhance realism, the ray tracing may simulate optical effects such as reflection, refraction, scattering, and dispersion.

In this way, the user uses web browsers 308A-B to enter a virtual space. The scene is displayed on the screen of the user. The webcam video stream and microphone audio stream of the user are sent to server 302. When other users enter the virtual space, an avatar model is created for them. The position of this avatar is sent to the server and received by the other users. The other users also get a notification from server 302 that an audio/video stream is available. The video stream of a user is placed on the avatar that was created for that user. The audio stream is played back as coming from the position of the avatar.

Figure 4A:
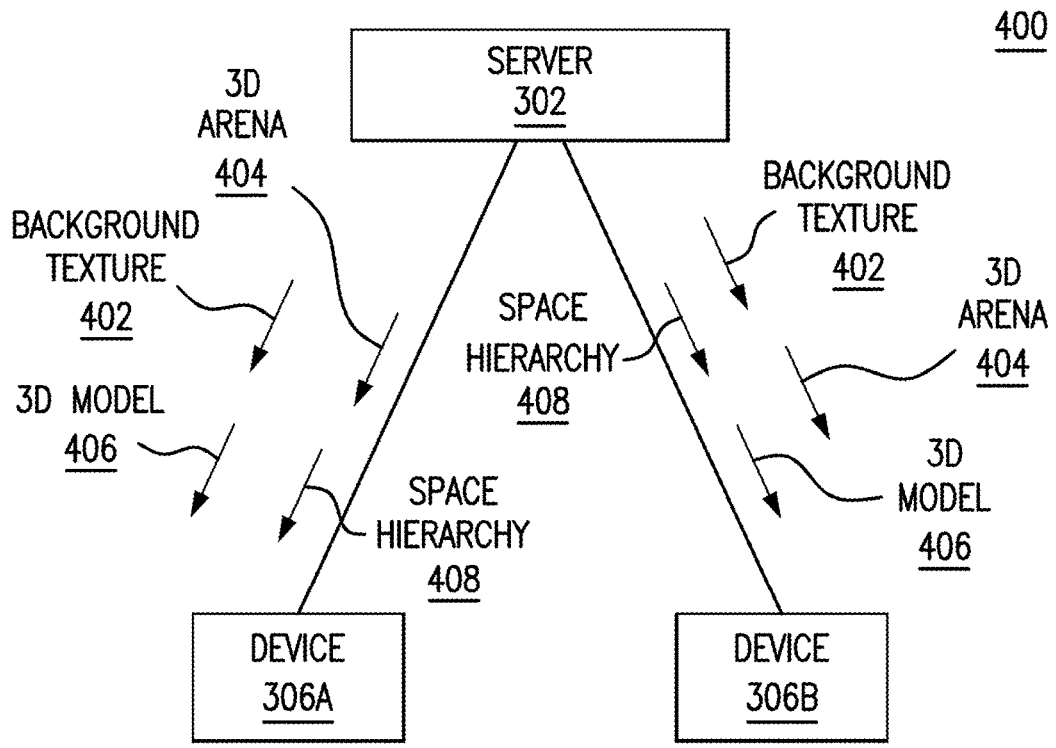
FIGS. 4A-D illustrates how data is transferred between various components of the system in FIG. 3 to provide videoconferencing and emotes.
Figure 4B:
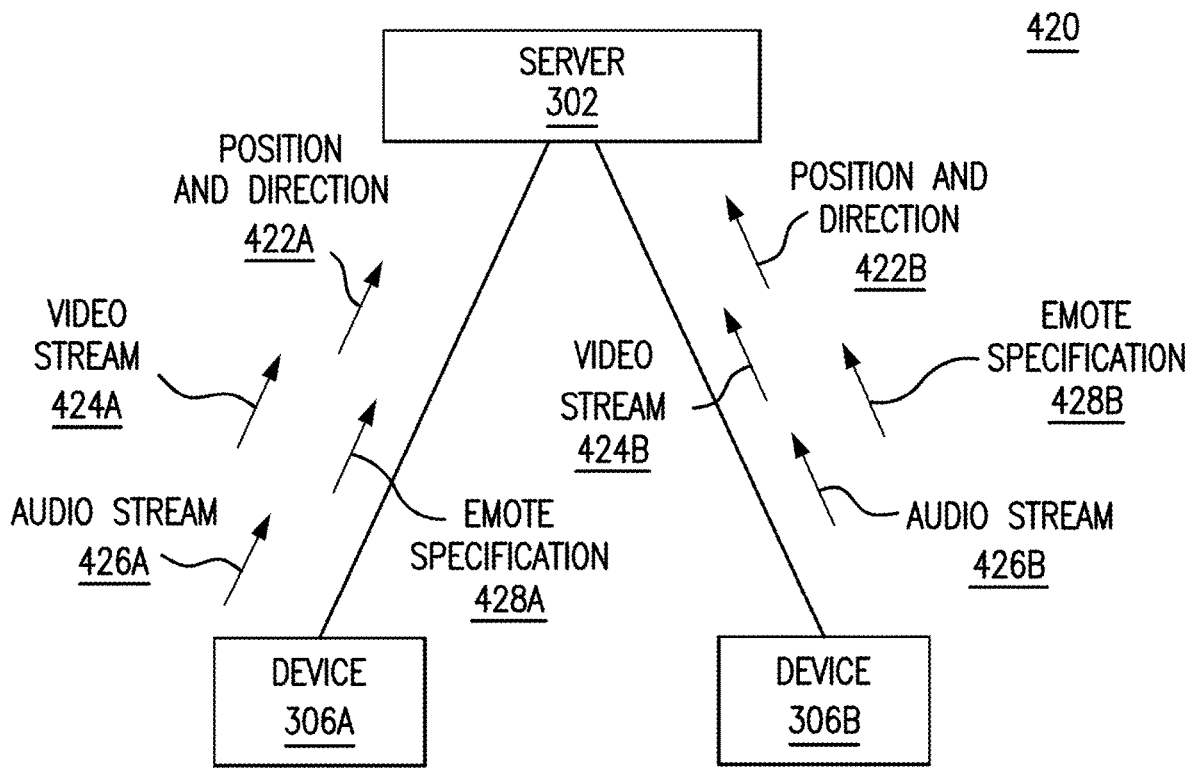
Figure 4C:
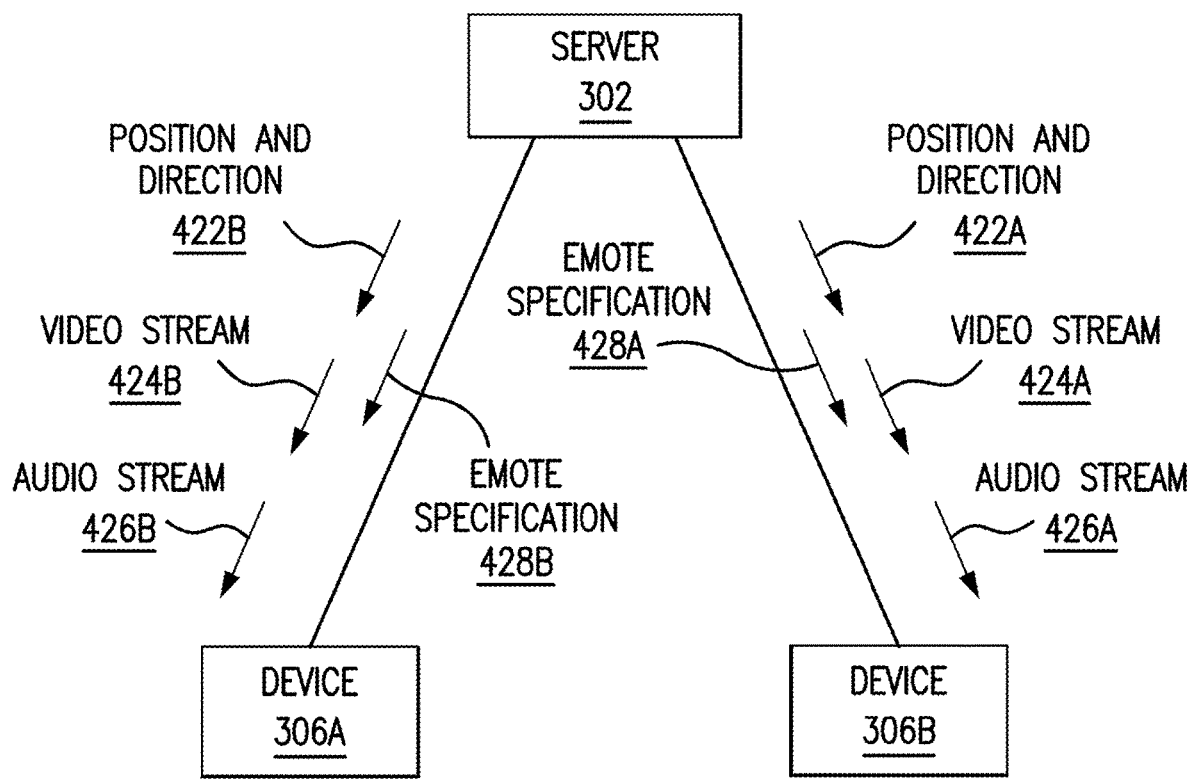

FIGS. 4A-D illustrate how data is transferred between various components of the system in FIG. 3 to provide videoconferencing. Like FIG. 3, each of FIGS. 4A-C depict the connection between server 302 and devices 306A and 306B. In particular, FIGS. 4A-C illustrate example data flows between those devices.

FIG. 4A illustrates a diagram 400 illustrating how server 302 transmits data describing the virtual environment to devices 306A and 306B. In particular, both devices, 306A and 306B, receive from server 302 the three-dimensional arena 404, background texture 402, space hierarchy 408, and any other three-dimensional modeling information 406.

As described above, background texture 402 is an image illustrating distant features of the virtual environment. The image may be regular (such as a brick wall) or irregular (such as a mountain range). Background texture 402 may be encoded in any common image file format, such as bitmap, JPEG, GIF, or other file image format. It describes the background image to be rendered against, for example, a sphere at a distance.

Three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Space hierarchy 408 is data specifying partitions in the virtual environment. These partitions are used to determine how sound is processed before being transferred between participants. As will be described below, this partition data may be hierarchical and may describe sound processing to allow for areas where participants to the virtual conference can have private conversations or side conversations.

Three-dimensional model 406 is any other three-dimensional modeling information needed to conduct the conference. In one embodiment, this may include information describing the respective avatars. Alternatively or additionally, this information may include product demonstrations.

With the information needed to conduct the meeting sent to the participants, FIGS. 4B-C illustrate how server 302 forwards information from one device to another. FIG. 4B illustrates a diagram 420 showing how server 302 receives information from respective devices 306A and 306B, and FIG. 4C illustrates a diagram 420 showing how server 302 transmits the information to respective devices 306B and A. In particular, device 306A transmits position and direction 422A, video stream 424A, audio stream 426A, and emote specification 428A to server 302, which transmits position and direction 422A, video stream 424A, audio stream 426A and emote specification 428A to device 306B. And device 306B transmits position and direction 422B, video stream 424B, audio stream 426B, and emote specification 428B to server 302, which transmits position and direction 422B, video stream 424B, audio stream 426B and emote specification 428B to device 306A.

Positions and directions 422A-B describe the position and direction of the virtual camera for the user using device 306A. As described above, the position may be a coordinate in three-dimensional space (e.g., x, y, z coordinate) and the direction may be a direction in three-dimensional space (e.g., pan, tilt, roll). In some embodiments, the user may be unable to control the virtual camera's roll, so the direction may only specify pan and tilt angles. Similarly, in some embodiments, the user may be unable to change the avatar's z coordinate (as the avatar is bounded by virtual gravity), so the z coordinate may be unnecessary. In this way, positions and directions 422A-B each may include at least a coordinate on a horizontal plane in the three-dimensional virtual space and a pan and tilt value. Alternatively or additionally, the user may be able to "jump" it's avatar, so the Z position may be specified only by an indication of whether the user is jumping her avatar.

Emote specifications 428A-B are transmitted when a user of device 306A and 306B respectively indicates that the user would like to display in an emote. When emote specifications 428A-B reach a device of another participant, they signal the other participant's device to display an ability as specified in emote specifications 428A-B.

Any user input is available to trigger emote specifications 428A-B. In various embodiments, a user can signal that the user desires to display emote by any combination of: (i) pressing a button on a screen of the device; (ii) selecting from a list presented on the screen; (iii) pressing a certain key or key combination on the device; (iv) pressing a certain key or key combination on the device; (v) entering a command on a command palette; (vi) entering a command on a chat window; (vii) speaking a voice command captured using a microphone of the device; (viii) making a gesture captured using the camera of the device; (ix) making a mouse gesture; or (x) using another device separate from the device.

In one embodiment, to specify the emote to display, emote specifications 428A-B may be a computer code describing the appearance of the emote. For example, emote specifications 428A-B may include a JavaScript code or other executable code. In another embodiment, emote specifications 428A-B may include a specification of one of several emotes which each have appearances specified on the second computing device. For example, emote specifications 428A-B may include a Unicode character which specifies a character from the Webdings and Wingdings fonts, including emoji characters.

Emote specifications 428A-B may also specify a sound to emit. They may include a sound file or may include a link to a sound file. The sound may be played by a recipient in coordination, perhaps contemporaneously, with an emote being displayed.

In different examples, positions and directions 422A-B and emote specifications 428A-B may be transmitted and received using HTTP request responses or using socket messaging. Additionally, or alternatively, the positions and directions 422A-B and emote specifications 428A-B may be altered by allowing a user to change the user's own avatar to show the emote and to synchronize that change with others. Additionally, or alternatively, the positions and directions 422A-B and emote specifications 428A-B may be altered by creating a networked object that will be synchronized to other participants, by sending a special broadcast message that will cause other participants to show the emote, by allowing a user to change the user's personal settings to indicate that the specific emote is active, or by send a special chat command.

Video streams 424A-B are video data captured from a camera of the respective devices 306A and 306B. The video may be compressed. For example, the video may use any commonly known video codecs, including MPEG-4, VP8, or H.264. The video may be captured and transmitted in real time.

Similarly, audio streams 426A-B are audio data captured from a microphone of the respective devices. The audio may be compressed. For example, the video may use any commonly known audio codecs, including MPEG-4 or vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

The video streams 424A-B and audio streams 426A-B may be transmitted using the WebRTC application programming interface. The WebRTC is an API available in JavaScript. As described above, devices 306A and 306B download and run web applications, as conference applications 310A and 310B, and conference applications 310A and 310B may be implemented in JavaScript. Conference applications 310A and 310B may use WebRTC to receive and transmit video streams 424A-B and audio streams 426A-B by making API calls from its JavaScript.

As mentioned above, when a user leaves the virtual conference, this departure is communicated to all other users. For example, if device 306A exits the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A.

As described above, conference applications 310A and 310B may periodically or intermittently re-render the virtual space based on new information from respective video streams 424A and 424B, positions and directions 422A and 422B, and new information relating to the three-dimensional environment. For simplicity, each of these updates are now described from the perspective of device 306A. However, a skilled artisan would understand device 306B would behave similarly given similar changes.

As device 306A receives video stream 424B, device 306A texture maps frames from video stream 424A on to an avatar corresponding to device 306B. That texture mapped avatar is re-rendered within the three-dimensional virtual space and presented to a user of device 306A.

As device 306A receives a new position and direction 422B, device 306A generates the avatar corresponding to device 306B positioned at the new position and oriented at the new direction. The generated avatar is re-rendered within the three-dimensional virtual space and presented to the user of device 306A.

In some embodiments, server 302 may send updated model information describing the three-dimensional virtual environment. For example, server 302 may send updated information 402, 404, 406, or 408. When that happens, device 306A will re-render the virtual environment based on the updated information. This may be useful when the environment changes over time. For example, an outdoor event may change from daylight to dusk as the event progresses.

Again, when device 306B exits the virtual conference, server 302 sends a notification to device 306A indicating that device 306B is no longer participating in the conference. In that case, device 306A would re-render the virtual environment without the avatar for device 306B.

Figure 4D:
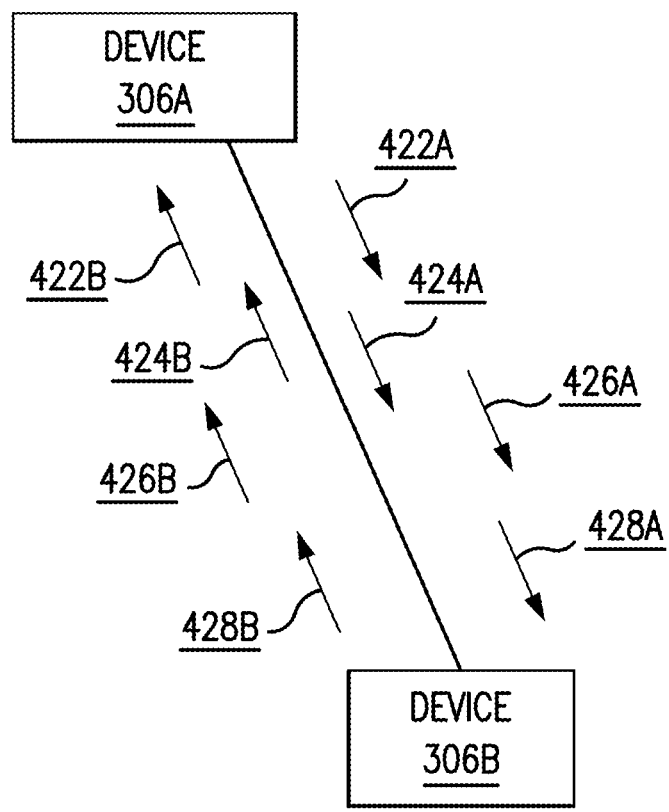

While FIG. 3 in FIGS. 4A-C is illustrated with two devices for simplicity, a skilled artisan would understand that the techniques described herein can be extended to any number of devices. Also, while FIG. 3 in FIGS. 4A-C illustrates a single server 302, a skilled artisan would understand that the functionality of server 302 can be spread out among a plurality of computing devices. In an embodiment, the data transferred in FIG. 4A may come from one network address for server 302, while the data transferred in FIGS. 4B-C can be transferred to/from another network address for server 302. As mentioned above, data can be transferred between devices on a peer-to-peer basis without the need for server 302, as illustrated in FIG. 4D.

The user or the system of the user may also indicate that the emote is only to be shown to certain participants. In that embodiment, emote specifications 428A-B may only be transmitted to the devices of users that the sender has selected. In this way, emotes can be kept private between two or more participants.

In one embodiment, participants can set their webcam, microphone, speakers, and graphical settings before entering the virtual conference. In an alternative embodiment, after starting the application, users may enter a virtual lobby where they are greeted by an avatar controlled by a real person. This person is able to view and modify the webcam, microphone, speakers and graphical settings of the user. The attendant can also instruct the user on how to use the virtual environment, for example by teaching them about looking, moving around and interacting. When they are ready, the user automatically leaves the virtual waiting room and joins the real virtual environment.

Example Emotes

Figure 5A:
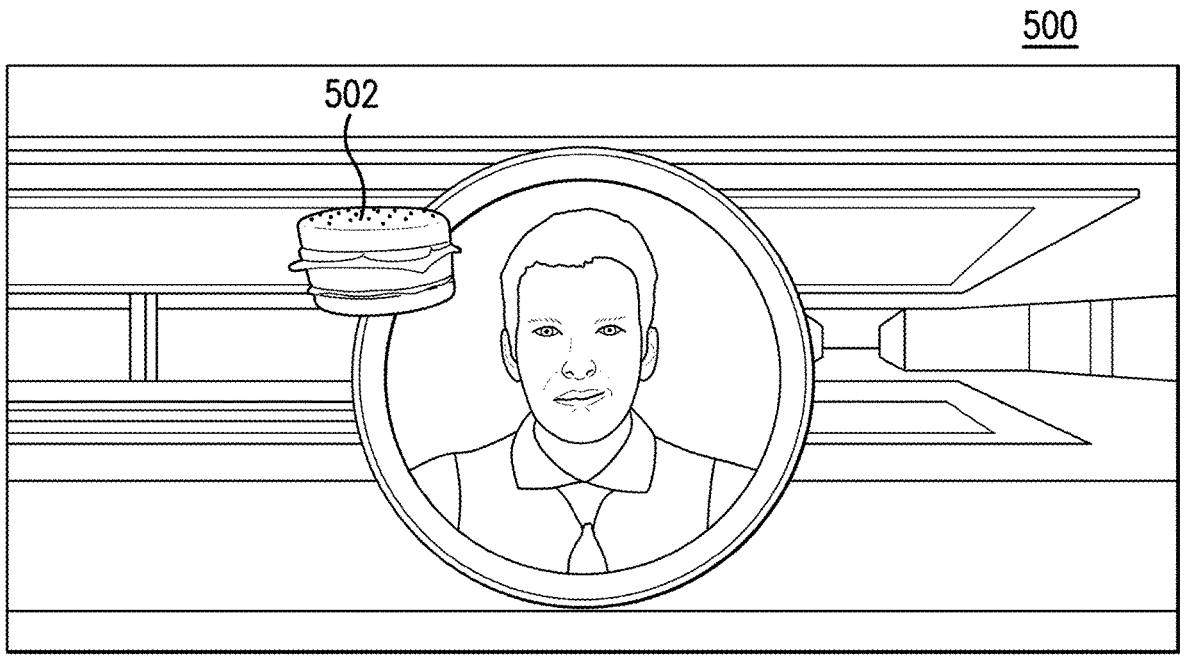
FIGS. 5A-B are examples of emotes as three-dimensional objects, according to an embodiment.
Figure 5B:
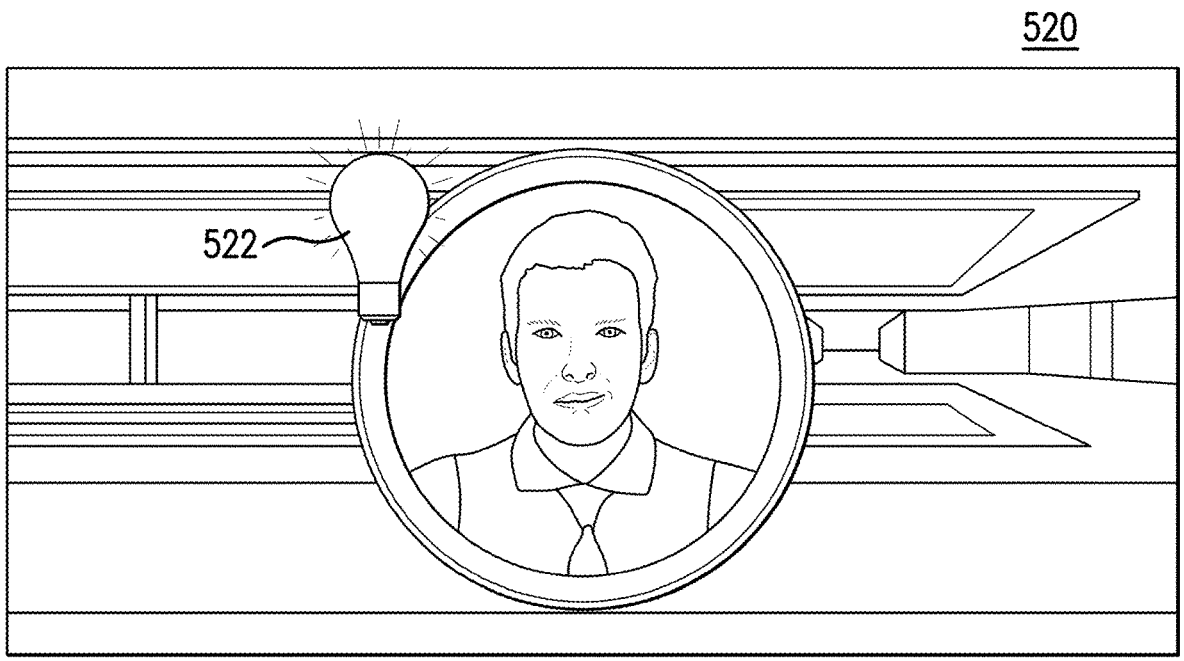

FIGS. 5A-B are examples of emotes as three-dimensional objects. FIG. 5A shows in interface 500 with a three-dimensional model 502 and FIG. 5 shows an interface 520 with a three-dimensional model 522. Just as three-dimensional model 118 described above, each of three-dimensional models 502 and 522 may be represented by voxels, splines, geometric primitives, polygons, or any other possible representation in three-dimensional space.

Figure 6A:
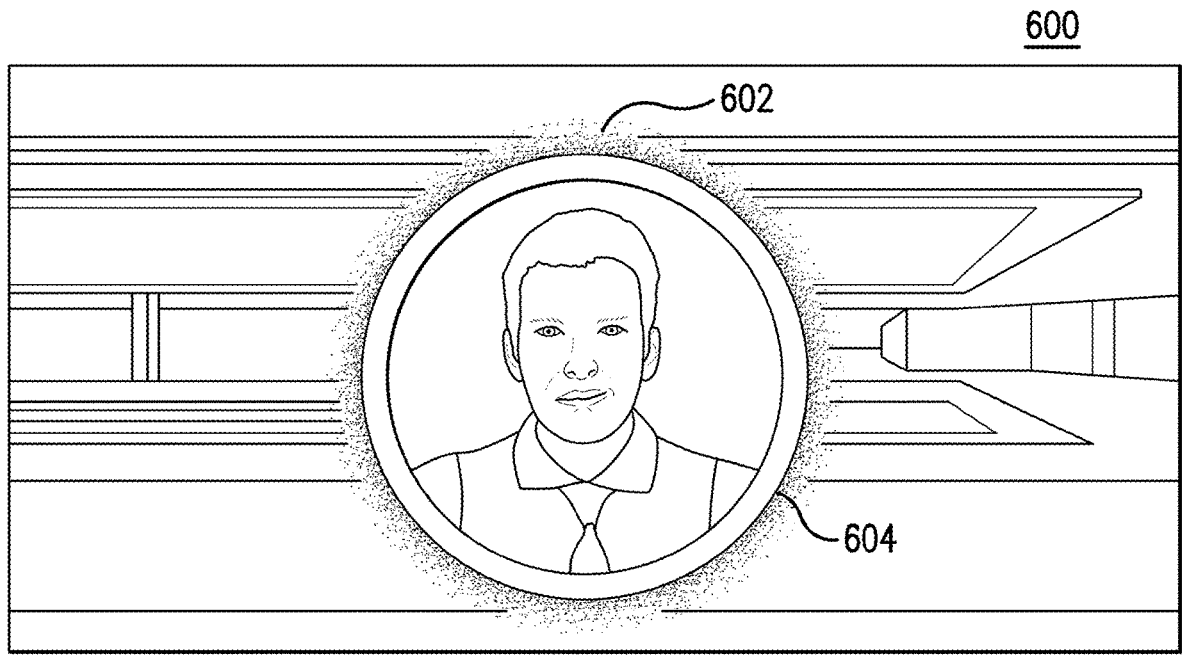
FIGS. 6A-B are examples of emotes as effects, according to an embodiment.
Figure 6B:
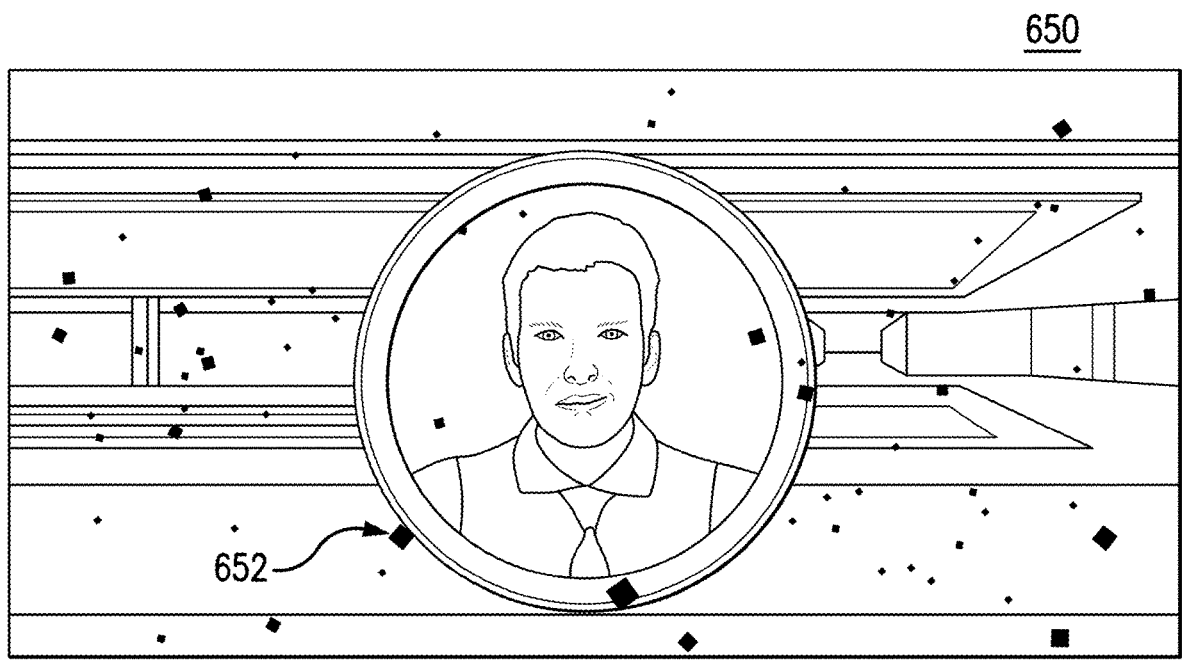

FIGS. 6A-B are examples of emotes as effects. FIG. 6A illustrates a lighting effect. In particular, FIG. 6A illustrates interface 600 with an avatar 604 that admits light 602. In this way, the MOT shown in FIG. 6A may make avatar 604 appear as if it is glowing. In different examples, the emote light sources can include, for example, point, directional, spotlight, and ambient. The emote may also specify certain properties describing how avatar 604 or other objects in the three-dimensional environment reflect light. In examples, the properties may include diffuse, ambient, and spectral lighting interactions. An example would be a lightbulb that is floating next to a user's avatar that indicates the user has an idea or would like to speak, or a hamburger emote that indicates "out to lunch."

FIG. 6B illustrates a particle effect for an emote. A particle effect is an effect that uses many minute sprites, 3D models, or other graphic objects to simulate behavior, often certain fuzzy phenomena that are otherwise very hard to reproduce with conventional rendering techniques. Examples may be usually highly chaotic systems, natural phenomena, or processes caused by chemical reactions. In particular, FIG. 6B shows a plurality of particles, including particle 652, which may be falling toward the ground within the virtual environment.

A particle effect may have an emitter that acts as a source of particles. Each particle may be represented using any technique to represent three-dimensional models, as described above, for example, with respect to three-dimensional model 118. Each particle may have certain behavior parameters specifying, for example, initial velocity, how its velocity changes, orientation, how its orientation changes, its color, and its lifetime. An example may be a "celebration" emote that would show fireworks.

Figure 7A:
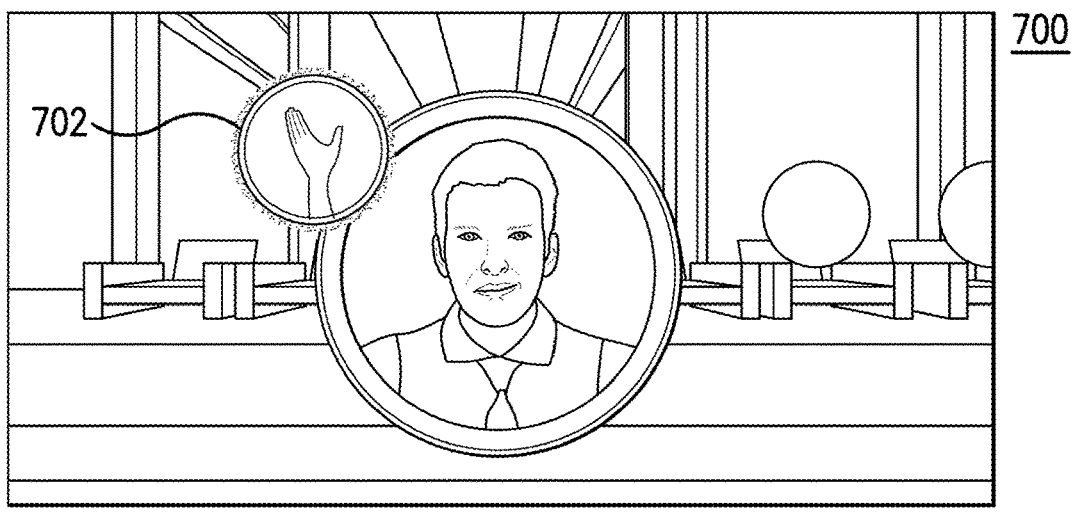
FIGS. 7A-C are examples of emotes as images of hand signals, according to an embodiment.
Figure 7B:
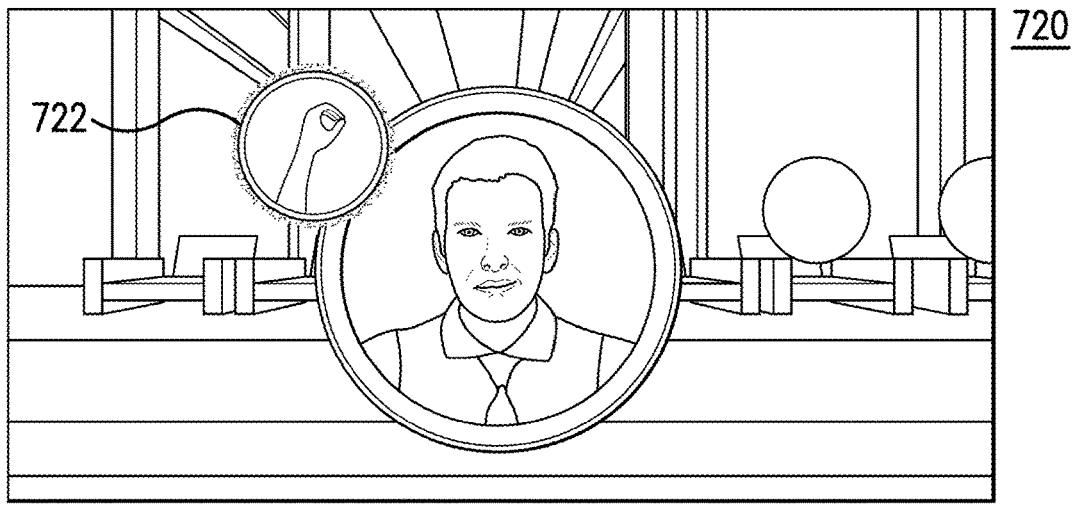
Figure 7C:
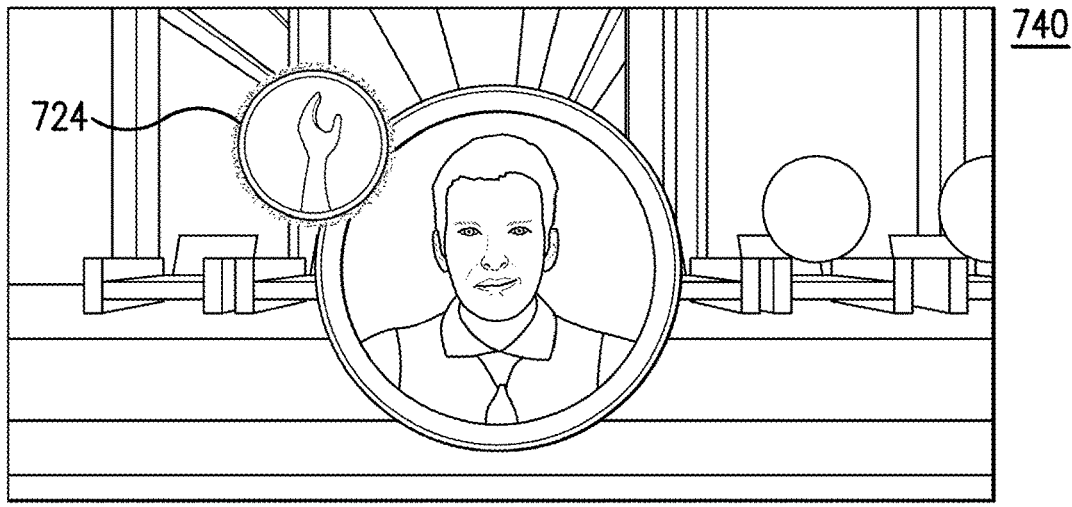

FIGS. 7A-C are examples of emotes as images of hand signals. FIG. 7A illustrates interface 700 with an emote 702; FIG. 7B illustrates interface 720 with an emote 722; and FIG. 7C illustrates interface 740 with an emote 742. In addition to hand signals, other gestures used in non-verbal communication may be represented in emotes. Example hand signals may include those from sign language, such as American Sign Language, those used in standard emojis, those used in driving or cycling, those used by special forces, and those used on trading floors. It is also possible that the emote can be interacted with or that the emote can itself interact with the world. For example, an emote that contains water may cause water to fall to the ground and wet the ground of the virtual environment.

An emote may involve the hand signals used in the open outcry method of communication between professionals on a stock exchange or a futures exchange. In some cases, they may be used in conjunction with audio signals that are played when the emote is displayed. In this way, embodiments can replicate the shouting and use of hand signals used to transfer information about buy and sell orders on a trading pit.

Figure 8A:
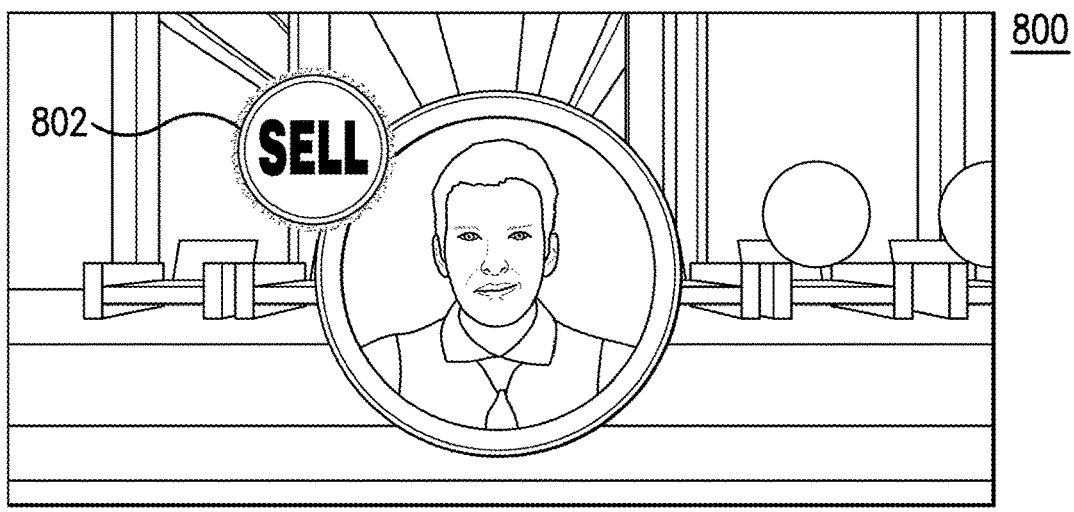
FIGS. 8A-C are examples of emotes as other example images, according to an embodiment.
Figure 8B:
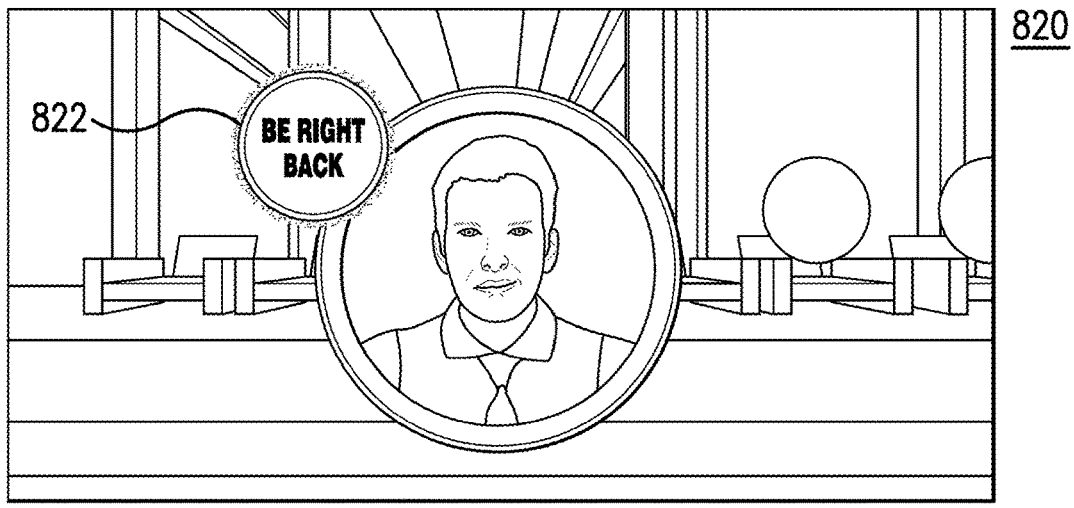
Figure 8C:
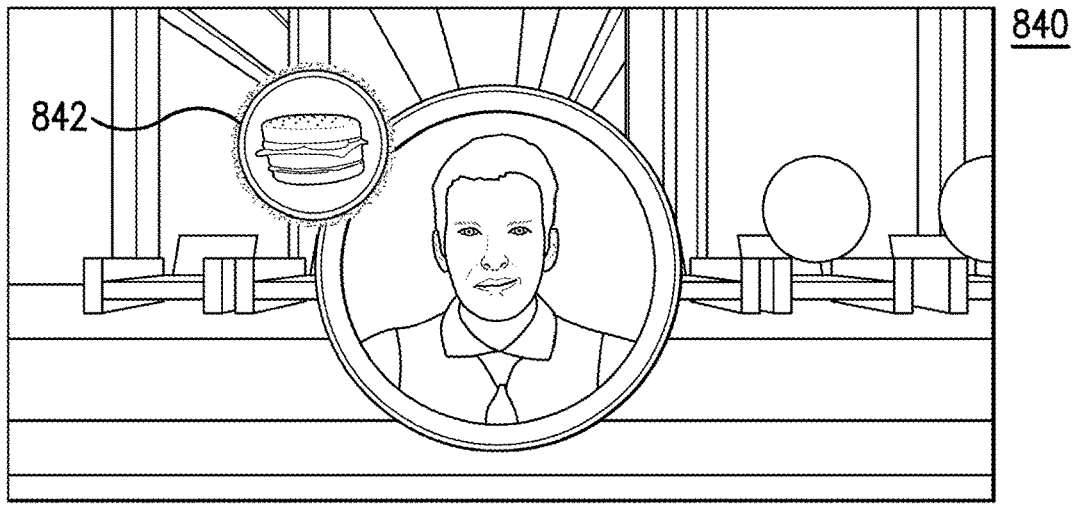

FIGS. 8A-C are examples of emotes as other example images. FIG. 8A shows an interface 800 with an emote 802; FIG. 8B shows an interface 820 with an emote 822; and FIG. 8B shows an interface 840 with and emote 842. In each case, the images are texture mapped onto three-dimensional models. Emotes 802 and 822 show text mapped (such as texture mapped) onto an object, and emotes 842 show a drawing mapped (such as texture mapped) onto an object. In other examples, photographic images or videos may also be used.

Emote Sound

Figure 9:
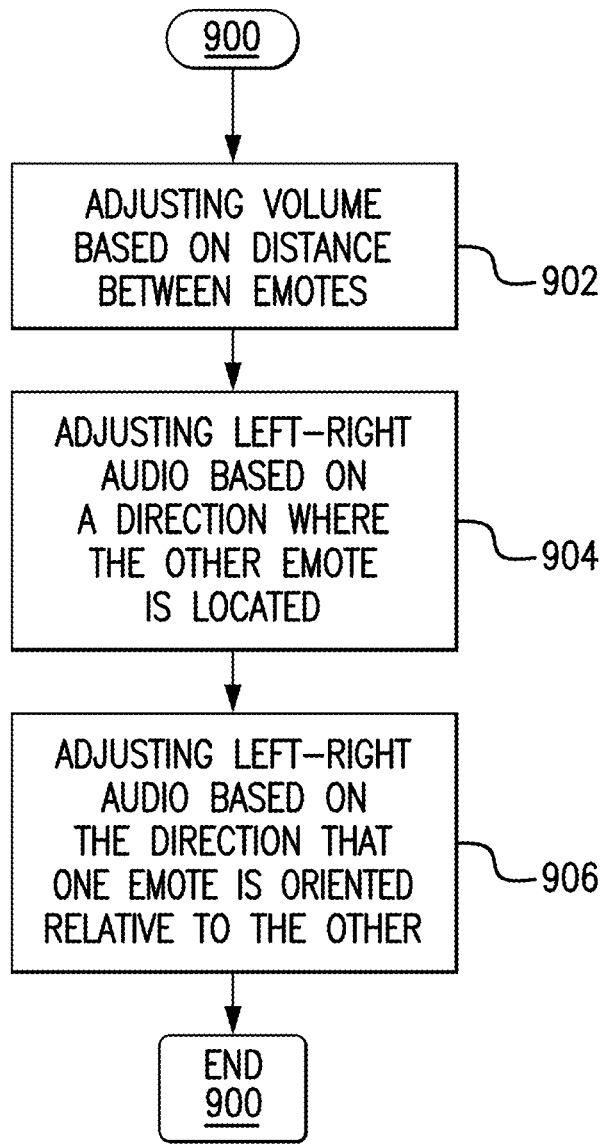
FIG. 9 is a flowchart illustrating a process for adjusting relative left-right volume to provide a sense of position in a virtual environment during a videoconference.

FIG. 9 is a flowchart illustrating a method 900 for adjusting relative left-right volume to provide a sense of position in a virtual environment during a videoconference.

At step 902, volume is adjusted based on distance between the avatars. As described above, an audio sound associated with an emote and an audio stream from a microphone of a device of another user is received. The volume of both the emotes' audio sound and the speaking user's microphone's audio stream is adjusted based on a distance between the speaking user and the recipient. In particular, volume rolls off as distance between the avatars increases. As distance between the users increases, the volume may stay constant until a reference distance is reached. At that point, volume begins to drop off. In this way, all other things being equal, a closer audio source will often sound louder than a farther one. How fast the sound drops off depends on a roll off factor. This may be a coefficient built into the settings of the videoconferencing system or the client device. A greater roll off factor will cause the volume to deteriorate more rapidly than a lesser one.

At step 904, relative left-right audio is adjusted based on a direction where the avatar/emote is located relative to the receiving user. That is, a volume of the audio to be output on the user's speaker (e.g., headset) will vary to provide a sense of where the speaking user's avatar is located. The relative volume of the left and right audio streams are adjusted based on a direction of a position where the user generating the audio stream is located (e.g., the location of the speaking user's avatar and the sound emitting emote) relative to a position where the user receiving the audio is located (e.g., the location of the virtual camera). The positions may be on a horizontal plane within the three-dimensional virtual space.

For example, at step 904, audio corresponding to an avatar/emote to the left of the virtual camera would be adjusted such that the audio is output on the receiving user's left ear at a higher volume than on the right ear. Similarly, audio corresponding to an avatar/emote to the right of the virtual camera would be adjusted such that the audio is output on the receiving user's right ear at a higher volume than on the left ear.

At step 906, relative left-right audio is adjusted based on the direction that one avatar/emote is oriented relative to the other. A relative volume of the left and right audio streams is adjusted based on an angle between the direction where the virtual camera is facing and a direction where the avatar/emote is facing such that the angle being more normal tends to have a greater difference in volume between the left and right audio streams.

For example, when an avatar/emote is directly facing the virtual camera, the relative left-right volume of the avatar/emote's corresponding audio stream may not be adjusted at all in step 906. When the avatar/emote is facing the left side of the virtual camera, the relative left-right volume of the avatar's corresponding audio stream may be adjusted so that left is louder than right. And, when the avatar is facing the right side of the virtual camera, the relative left-right volume of the avatar/emote's corresponding audio may be adjusted so that right is louder than left.

In an example, the calculation in step 906 may involve taking the cross product of the angle where the virtual camera is facing and the angle where the avatar is facing. The angles may be the direction they are facing on a horizontal plane.

In an embodiment, a check may be conducted to determine the audio output device the user is using. If the audio output device is not a set of headphones or another type of speaker that provides a stereo effect, the adjustments in steps 904 and 906 may not occur.

Steps 902-906 are repeated for every audio stream received from every other participant and their respective emotes. Based on the calculations in steps 902-906, a left and right audio gain is calculated for every other participant.

In this way, the audio streams for each participant are adjusted to provide a sense of where the participant's avatar/emote is located in the three-dimensional virtual environment.

Not only are audio streams adjusted to provide a sense of where avatars are located, but in certain embodiments, audio streams can be adjusted to provide private or semi-private volume areas. In this way, the virtual environment enables users to have private conversations. Also, it enables users to mingle with one another and allow separate, side conversations to occur, something that is not possible with conventional videoconferencing software. This is illustrated, for example, in with respect to FIG. 10.

Figure 10:
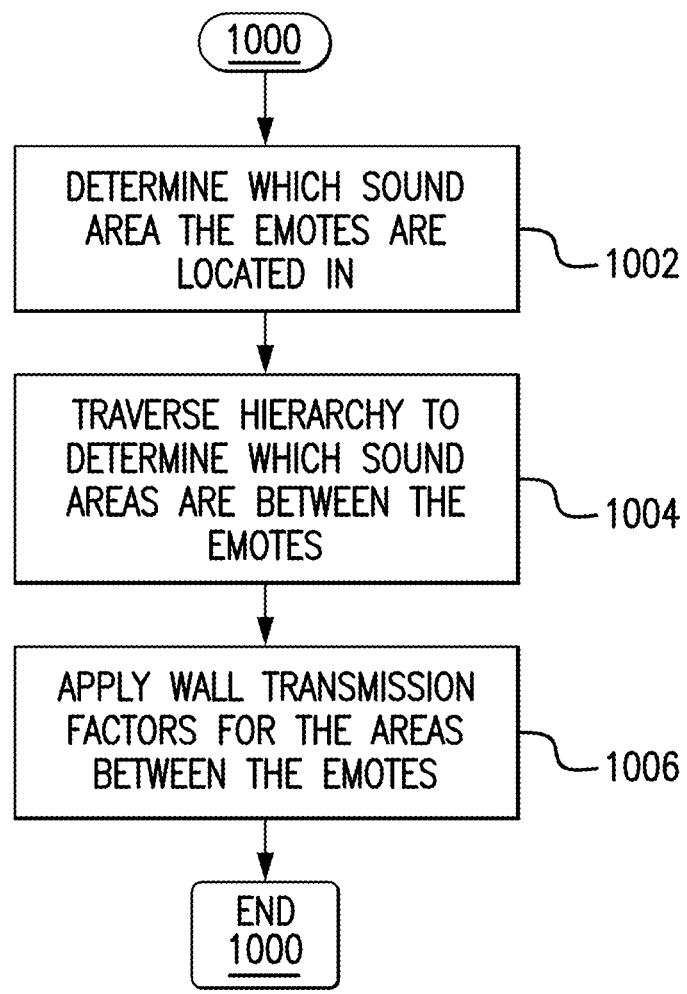
FIG. 10 is a flowchart illustrating a process for adjusting relative volume to provide different volume areas in a virtual environment during a videoconference.

FIG. 10 is a flowchart illustrating a method for adjusting relative volume to provide different volume areas in a virtual environment during a videoconference.

As described above, the server may provide specification of sound or volume areas to the client devices. Virtual environment may be partitioned into different volume areas. At step 1002, a device determines in which sound areas the respective avatars/emotes and the virtual camera are located. Volume spaces may be hierarchical, such as represented in a hierarchical tree. To determine which sound areas are between the user and an avatar or emote, the hierarchical tree may be traversed. Each different area that needs to be traversed may require passing through virtual "walls," attenuating the audio stream. Each wall attenuates by particular factor, as discussed with respect to steps 1004 and 1006.

At step 1004, the hierarchy is traversed to determine which various sound areas are between the avatars/emotes. Starting from the node corresponding to the virtual area of the speaking voice or emote, a path to the node of the receiving user is determined. To determine the path, the links going between the nodes are determined. In this way, a subset of areas between an area including the avatar and an area including the virtual camera is determined.

At step 1006, the audio stream from the speaking user or emote is attenuated based on respective wall transmission factors of the subset of areas. Each respective wall transmission factor specifies how much the audio stream is attenuated.

Additionally, or alternatively, the different areas have different roll off factors in that case, the distance-based calculation shown in method 1000 may be applied for individual areas based on the respective roll off factors. In this way, different areas of the virtual environment project sound at different rates. The audio gains determined in the method as described above with respect to FIG. 9 may be applied to the audio stream to determine left and right audio accordingly. In this way, both wall transmission factors, roll off factors, and left-right adjustments to provide a sense of direction for the sound may be applied together to provide a comprehensive audio experience.

Different audio areas may have different functionality. For example, a volume area may be a podium area. If a sound-emitting emote is located in the podium area, some or all of the attenuation described with respect to FIG. 9 or 10 may not occur. For example, no attenuation may occur because of roll off factors or wall transmission factors. In some embodiments, the relative left-right audio may still be adjusted to provide a sense of direction.

For exemplary purposes, the methods described with respect to FIGS. 9 and 10 are describing audio streams from a user who has a corresponding avatar and emote. However, the same methods may be applied to other sound sources, other than avatars and emotes. For example, the virtual environment may have three-dimensional models of speakers. Sound may be emitted from the speakers in the same way as the avatar models described above, either because of a presentation or just to provide background music.

System

Figure 11:
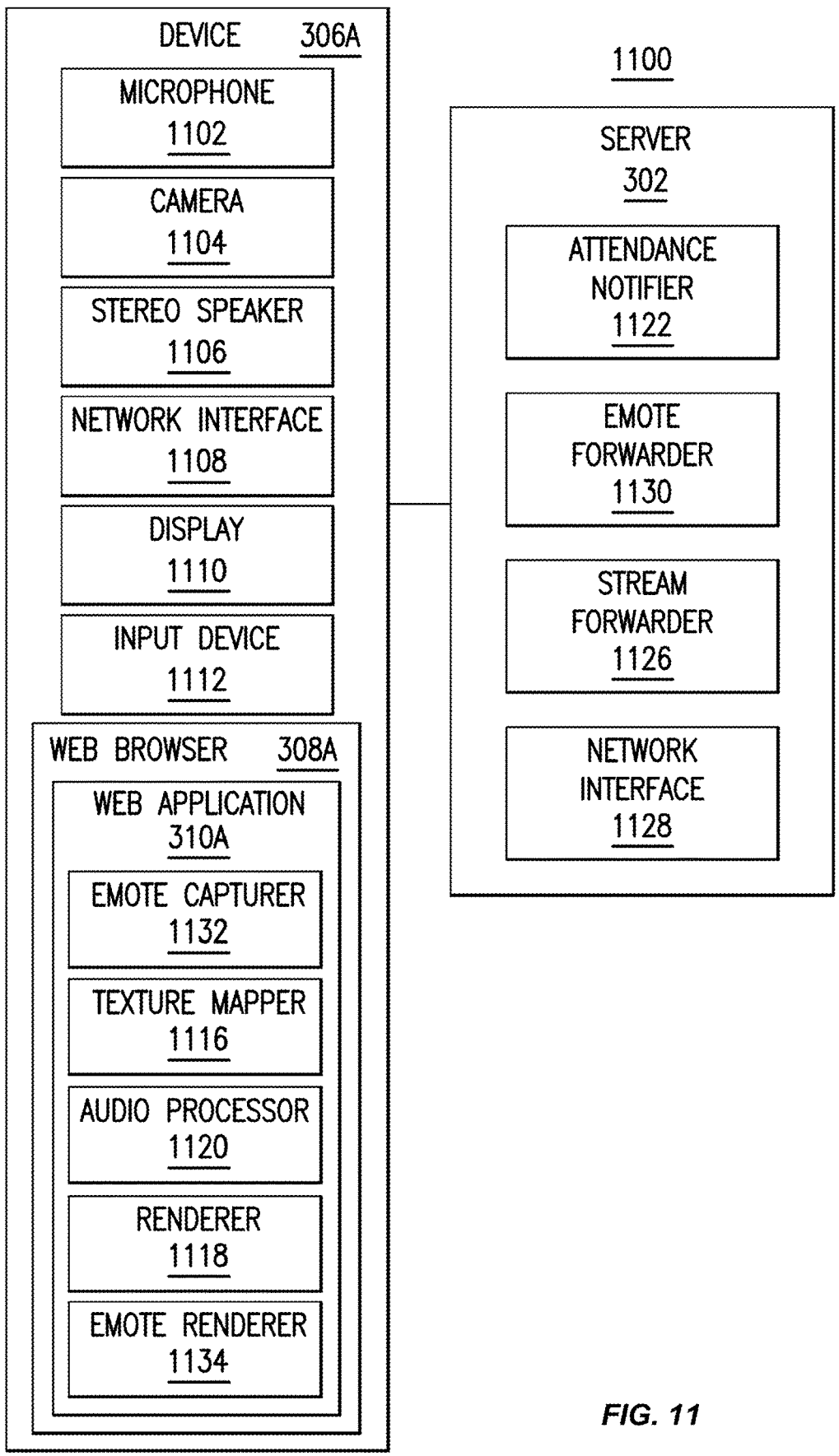
FIG. 11 is a diagram illustrating components of devices used to provide videoconferencing within a virtual environment, according to an embodiment.

FIG. 11 is a diagram of a system 1100 illustrating components of devices used to provide videoconferencing within a virtual environment. In various embodiments, system 1100 can operate according to the methods described above.

Device 306A is a user computing device. Device 306A could be a desktop or laptop computer, smartphone, tablet, or wearable (e.g., watch or head mounted device). Device 306A includes a microphone 1102, camera 1104, stereo speaker 1106, input device 1112. Not shown, device 306A also includes a processor and persistent, non-transitory and volatile memory. The processors can include one or more central processing units, graphic processing units or any combination thereof.

Microphone 1102 converts sound into an electrical signal. Microphone 1102 is positioned to capture speech of a user of device 306A. In different examples, microphone 1102 could be a condenser microphone, electret microphone, moving-coil microphone, ribbon microphone, carbon microphone, piezo microphone, fiber-optic microphone, laser microphone, water microphone, or MEMs microphone.

Camera 1104 captures image data by capturing light, generally through one or more lenses. Camera 1104 is positioned to capture photographic images of a user of device 306A. Camera 1104 includes an image sensor (not shown). The image sensor may, for example, be a charge coupled device (CCD) sensor or a complementary metal oxide semiconductor (CMOS) sensor. The image sensor may include one or more photodetectors that detect light and convert to electrical signals. These electrical signals captured together in a similar timeframe comprise a still photographic image. A sequence of still photographic images captured at regular intervals together comprise a video. In this way, camera 1104 captures images and videos.

Stereo speaker 1106 is a device which converts an electrical audio signal into a corresponding left-right sound. Stereo speaker 1106 outputs the audio stream(s) received from other meeting participants, or from audio processor 1120. Stereo speaker 1106 includes both ambient speakers and headphones that are designed to play sound directly into a user's left and right ears. Example speakers include moving-iron loudspeakers, piezoelectric speakers, magnetostatic loudspeakers, electrostatic loudspeakers, ribbon and planar magnetic loudspeakers, bending wave loudspeakers, flat panel loudspeakers, Heil air motion transducers, transparent ionic conduction speakers, plasma arc speakers, thermoacoustic speakers, rotary woofers, moving-coil, electrostatic, electret, planar magnetic, and balanced armature.

Network interface 1108 is a software or hardware interface between two pieces of equipment or protocol layers in a computer network. Network interface 1108 receives a video stream from server 302 for respective participants for the meeting. The video stream is captured from a camera on a device of another participant to the video conference. Network interface 1108 also received data specifying a three-dimensional virtual space and any models therein from server 302. For each of the other participants, network interface 1108 receives a position and direction in the three-dimensional virtual space. The position and direction are input by each of the respective other participants.

Network interface 1108 also transmits data to server 302. It transmits the position of device 306A's user's virtual camera used by renderer 1118 and it transmits video and audio streams from camera 1104 and microphone 1102.

Display 1110 is an output device for presentation of electronic information in visual or tactile form (the latter used for example in tactile electronic displays for blind people). Display 1110 could be a television set, computer monitor, head-mounted display, heads-up displays, output of an augmented reality or virtual reality headset, broadcast reference monitor, medical monitors mobile displays (for mobile devices), or Smartphone displays (for smartphones). To present the information, display 1110 may include an electroluminescent (ELD) display, liquid crystal display (LCD), light-emitting diode (LED) backlit LCD, thin-film transistor (TFT) LCD, light-emitting diode (LED) display, OLED display, AMOLED display, plasma (PDP) display, or quantum dot (QLED) display.

Input device 1112 is a piece of equipment used to provide data and control signals to an information processing system such as a computer or information appliance. Input device 1112 allows a user to input a new desired position of a virtual camera used by renderer 1118, thereby enabling navigation in the three-dimensional environment. Examples of input devices include keyboards, mouse, scanners, joysticks, and touchscreens.

Web browser 308A and conference application 310A were described above with respect to FIG. 3. Conference application 310A includes emote capturer 1132, texture mapper 1116, renderer 1118, emote renderer 1134 and audio processor 1120.

Emote capturer 1132 captures the users desire to broadcast an emote and captures the user's selection of which emote to use. As described above, any user input may be used to select whether and what emote to broadcast to other users. In an embodiment, emote capturer 1132 may assess whether a user has permission to use an emote and only allows selection of those emotes that a user has permission to use. The permission information may be stored in, for example, a policy file. Alternatively, or additionally, this security check may be done at the server or at the receiving device.

Texture mapper 1116 textures map the video stream onto a three-dimensional model corresponding to an avatar. Texture mapper 1116 may texture map respective frames from the video to the avatar. In addition, texture mapper 1116 may texture map a presentation stream to a three-dimensional model of a presentation screen.

Renderer 1118 renders, from a perspective of a virtual camera of the user of device 306A, for output to display 1110 the three-dimensional virtual space including the texture-mapped three-dimensional models of the avatars for respective participants located at the received, corresponding position and oriented at the direction. Renderer 1118 also renders any other three-dimensional models including, for example, the presentation screen.

Similarly, emote renderer 1134 renders, from a perspective of a virtual camera of the user of device 306A, for output to display 1110 any emotes, for which such classifications have been received from server 302. Emote renderer 1134 renders the emotes within the three-dimensional virtual space, as described above.

Audio processor 1120 adjusts volume of a received audio stream (such as corresponding to a participant or emote) to determine a left audio stream and a right audio stream to provide a sense of where the second position is in the three-dimensional virtual space relative to the first position. In one embodiment, audio processor 1120 adjusts the volume based on a distance between the second position to the first position. In another embodiment, audio processor 1120 adjusts the volume based on a direction of the second position to the first position. In yet another embodiment, audio processor 1120 adjusts the volume based on a direction of the second position relative to the first position on a horizontal plane within the three-dimensional virtual space. In yet another embodiment, audio processor 1120 adjusts the volume based on a direction where the virtual camera is facing in the three-dimensional virtual space such that the left audio stream tends to have a higher volume when the avatar is located to the left of the virtual camera and the right audio stream tends to have a higher volume when the avatar is located to the right of the virtual camera. Finally, in yet another embodiment, audio processor 1120 adjusts the volume based on an angle between the direction where the virtual camera is facing and a direction where the avatar is facing such that the angle being more normal to where the avatar is facing tends to have a greater difference in volume between the left and right audio streams.

Audio processor 1120 can also adjust an audio stream's volume based on the area where the sound emitter (such as a speaker or an emote) is located relative to an area where the virtual camera is located. In this embodiment, the three-dimensional virtual space is segmented into a plurality of areas. These areas may be hierarchical. When the speaker and virtual camera are located in different areas, a wall transmission factor may be applied to attenuate the speaking audio stream's volume.

Server 302 includes an attendance notifier 1122, an emote forwarder 1130, and a stream forwarder 1126.

Attendance notifier 1122 notifies conference participants when participants join and leave the meeting. When a new participant joins the meeting, attendance notifier 1122 sends a message to the devices of the other participants to the conference indicating that a new participant has joined. Attendance notifier 1122 signals stream forwarder 1126 to start forwarding video, audio, and position/direction information to the other participants.

Stream forwarder 1126 broadcasts position/direction information, video, audio, and perhaps screen share screens received (with possible adjustments, such as for available bandwidth). Stream forwarder 1126 may send information to the device 306A in response to a request from conference application 310A. Conference application 310A may send that request in response to the notification from attendance notifier 1122.

Similar to stream forwarder 1126, emote forwarder 1130 broadcasts emote specifications received to devices of other meeting participants. Stream forwarder 1126 may send information to the device 306A in response to a request from conference application 310A. Conference application 310A may send that request in response to the notification from attendance notifier 1122.

Network interface 1128 is a software or hardware interface between two pieces of equipment or protocol layers in a computer network. Network interface 1128 transmits the model information to devices of the various participants. Network interface 1128 receives video, audio, and screen share screens from the various participants.

Emote capturer 1132, texture mapper 1116, renderer 1118, emote renderer 1134, attendance notifier 1122, emote forwarder 1130, audio processor 1120 and stream forwarder 1126 can each be implemented in hardware, software, firmware, or any combination thereof.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for videoconferencing in a three-dimensional virtual environment, comprising:
    receiving a video stream captured from a camera on a first device of a first user;
    receiving a specification of an emote, the specification being input by the first user through the first device;
    mapping the video stream onto a three-dimensional model of an avatar of the first user; and
    from a perspective of a virtual camera of a second user, rendering for display to the second user through a second device the three-dimensional virtual environment including: (i) the mapped three-dimensional model of the avatar, and (ii) the emote attached to the three-dimensional model of the avatar, wherein the emote emits sound played by the second device to the second user, and wherein the sound is adjusted based on a distance of the avatar to the virtual camera of the second user within the three-dimensional virtual environment.

2. The method of claim 1, wherein the specification of the emote specifies the sound to emit.

3. The method of claim 2, wherein the specification specifies a sound file or a link to a sound file to retrieve.

4. The method of claim 1, wherein the sound is emitted through the second device contemporaneously with the display of the emote through the second device.

5. The method of claim 1, wherein the emote is static.

6. The method of claim 1, wherein the emote contains an animation or video.

7. The method of claim 1, wherein the specification of the emote is transmitted from the first device in response to at least one of the first user:
    (i) pressing a button on a screen of the first device;
    (ii) selecting from a list presented on the screen;
    (iii) pressing a certain key on the first device;
    (iv) entering a command on a command palette;
    (v) entering the command on a chat window;
    (vi) speaking a voice command captured using a microphone of the first device;
    (vii) making a gesture captured using the camera of the first device;
    (viii) making a mouse gesture; and
    (ix) using another device separate from the first device.

8. The method of claim 1, wherein the displayed emote comprises at least one of:
    (i) the three-dimensional model;
    (ii) an image placed on a surface of the three-dimensional model;
    (iii) at least a partially transparent 2D or 3D texture;
    (iv) text;
    (v) a particle effect;
    (vi) a lighting effect; and
    (vii) a postprocessing effect.

9. A non-transitory computer-readable device having instructions stored thereon that, when executed by at least one computing device, cause the at least one computing device to perform operations comprising:
    receiving a video stream captured from a camera on a first device of a first user;
    receiving a specification of an emote, the specification being input by the first user through the first device;
    mapping the video stream onto a three-dimensional model of an avatar of the first user; and
    from a perspective of a virtual camera of a second user, rendering for display to the second user through a second device a three-dimensional virtual environment including: (i) the mapped three-dimensional model of the avatar, and (ii) the emote attached to the three-dimensional model of the avatar, wherein the emote emits sound played by the second device to the second user, and wherein the sound is adjusted based on a distance of the avatar to the virtual camera of the second user within the three-dimensional virtual environment.

10. The non-transitory computer-readable device of claim 9, wherein the specification of the emote specifies the sound to emit.

11. The non-transitory computer-readable device of claim 10, wherein the specification specifies a sound file or a link to a sound file to retrieve.

12. The non-transitory computer-readable device of claim 9, wherein the sound is emitted through the second device contemporaneously with the display of the emote through the second device.

13. The non-transitory computer-readable device of claim 9, wherein the emote is static.

14. The non-transitory computer-readable device of claim 9, wherein the emote contains an animation or video.

15. The non-transitory computer-readable device of claim 9, wherein the specification of the emote is transmitted from the first device in response to at least one of the first user:
(i) pressing a button on a screen of the first device;
(ii) selecting from a list presented on the screen;
(iii) pressing a certain key on the first device;
(iv) entering a command on a command palette;
(v) entering the command on a chat window;
(vi) speaking a voice command captured using a microphone of the first device;
(vii) making a gesture captured using the camera of the first device;
(viii) making a mouse gesture; and
(ix) using another device separate from the first device.

16. The non-transitory computer-readable device of claim 9, wherein the displayed emote comprises at least one of:
(i) the three-dimensional model;
(ii) an image placed on a surface of the three-dimensional model;
(iii) at least a partially transparent 2D or 3D texture;
(iv) text;
(v) a particle effect;
(vi) a lighting effect; and
(vii) a postprocessing effect.

17. A device for videoconferencing in a three-dimensional virtual environment, comprising:
a processor;
a memory;
a network interface configured to (i) receive a video stream captured from a camera on a first device of a first user, and (ii) receive a specification of an emote, the specification being input by the first user through the first device;
a texture mapper configured to map the video stream onto a three-dimensional model of an avatar of the first user; and
a renderer configured to, from a perspective of a virtual camera of a second user, render for display to the second user through a second device the three-dimensional virtual environment including the mapped three-dimensional model of the avatar;
an emote renderer configured to, from the perspective of the virtual camera of the second user, render for display to the second user through the second device the emote attached to the three-dimensional model of the avatar, wherein the emote emits sound played by the second device to the second user, and wherein the sound is adjusted based on a distance of the avatar to the virtual camera of the second user within the three-dimensional virtual environment.

18. The device of claim 17, wherein the specification of the emote specifies the sound to emit.

19. The device of claim 17, wherein the sound is emitted contemporaneously with display of the emote.

20. The device of claim 17, wherein the displayed emote comprises at least one of:
(i) the three-dimensional model;
(ii) an image placed on a surface of the three-dimensional model;
(iii) at least a partially transparent 2D or 3D texture;
(iv) text;
(v) a particle effect;
(vi) a lighting effect; and
(vii) a postprocessing effect.

* * * * *